US009446762B2

(12) United States Patent
Lee et al.

(10) Patent No.: US 9,446,762 B2

(45) Date of Patent: Sep. 20, 2016

(54) SHIFT CONTROL APPARATUS AND METHOD OF HYBRID VEHICLE

(71) Applicant: Hyundai Motor Company, Seoul (KR)

(72) Inventors: Seung Han Lee, Gyeonggi-Do (KR); Soo Bang Lee, Gyeonggi-Do (KR); Kyoung Cheol Oh, Gyeonggi-Do (KR); Jun Geol Song, Seoul (KR); Seong Ik Park, Seoul (KR); Jee Wook Huh, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 45 days.

(21) Appl. No.: 14/554,248

(22) Filed: Nov. 26, 2014

(65) Prior Publication Data

US 2016/0046280 A1 Feb. 18, 2016

(30) Foreign Application Priority Data

Aug. 12, 2014 (KR) ........................ 10-2014-0104350

(51) Int. Cl.

| | |
|---|---|
| ***B60W 20/30*** | (2016.01) |
| ***B60W 20/40*** | (2016.01) |
| ***B60W 10/02*** | (2006.01) |
| ***B60W 10/10*** | (2012.01) |
| ***B60W 20/00*** | (2016.01) |

(52) U.S. Cl.

CPC .............. *B60W 20/30* (2013.01); *B60W 10/02* (2013.01); *B60W 10/10* (2013.01); *B60W 20/106* (2013.01); *B60W 20/40* (2013.01); *B60W 2510/02* (2013.01); *B60W 2510/18* (2013.01); *B60W 2510/244* (2013.01); *B60W 2510/246* (2013.01); *B60W 2710/021* (2013.01); *B60W 2710/10* (2013.01)

(58) Field of Classification Search

None

See application file for complete search history.

(56) References Cited

U.S. PATENT DOCUMENTS

| | | | | |
|---|---|---|---|---|
| 2003/0064855 | A1 | 4/2003 | Tanaka et al. | |
| 2013/0332020 | A1* | 12/2013 | Uchihara .............. | B60W 20/12 701/22 |
| 2014/0018207 | A1* | 1/2014 | Kobayashi ............... | B60K 6/48 477/5 |
| 2014/0180521 | A1* | 6/2014 | Tsuchikawa ............. | B60K 6/48 701/22 |
| 2014/0316625 | A1* | 10/2014 | Yoshikawa ........... | F16H 61/143 701/22 |

FOREIGN PATENT DOCUMENTS

| | | | |
|---|---|---|---|
| JP | 2003-083442 | A | 3/2003 |
| JP | 2012-218697 | A | 11/2012 |
| JP | 2013-126812 | A | 6/2013 |
| KR | 10-0424760 | | 3/2004 |
| KR | 10-2010-0020382 | A | 2/2010 |
| KR | 10-1007784 | | 1/2011 |
| KR | 10-1048143 | | 7/2011 |
| KR | 10-2014-0144622 | A | 12/2014 |

* cited by examiner

*Primary Examiner* — Adam Tissot

*Assistant Examiner* — Timothy Nesley

(74) *Attorney, Agent, or Firm* — Mintz Levin Cohn Ferris Glovsky and Popeo, P.C.; Peter F. Corless

(57) ABSTRACT

A shift control system and method of a hybrid vehicle are provided and controlled by dualizing a brake shift pattern based on whether an engine clutch release is possible when a hybrid vehicle brake is engaged. The system includes a hybrid controller that is configured to detect whether engine clutch release is possible, based on battery state information and input data from a operation. In addition, a shift controller is configured to execute a gear shift by a brake shift pattern based on whether the engine clutch release is possible.

12 Claims, 5 Drawing Sheets

START

ON DRIVING — S11

BRAKE? — S12 (No / Yes)

ENGINE CLUTCH RELEASE IS POSSIBLE? — S13 (Yes / No)

CONTROLLING A GEAR SHIFT BY A MOTOR BRAKE SHIFT PATTERN — S14

CONTROLLING A GEAR SHIFT BY AN ENGINE BRAKE SHIFT PATTERN — S15

END

SHIFT CONTROL APPARATUS AND METHOD OF HYBRID VEHICLE

CROSS-REFERENCE TO RELATED APPLICATION

This application is based on and claims priority from Korean Patent Application No. 10-2014-0104350, filed on Aug. 12, 2014 in the Korean Intellectual Property Office, the disclosure of which is incorporated herein in its entirety by reference.

BACKGROUND

1. Field of the Invention

The present invention relates to a shift control apparatus and method of a hybrid vehicle, and more particularly, a shift control apparatus and method of a hybrid vehicle controlled by dualizing a brake shift pattern based on whether an engine clutch release is possible when a hybrid vehicle brake pedal is engaged.

2. Description of the Prior Art

A hybrid vehicle is driven by two or more power sources and when a hybrid vehicle brakes for deceleration (e.g., when the brake is engaged), it is controlled to maintain a substantially high motor rotation speed to maximize the charging amount by a regenerative braking. Conventionally, to maintain the substantially high motor rotation speed, the brake shift pattern inducing the shift gear stage to the low stage is used. The method is used to separate the motor rotation speed and the engine rotation speed by releasing the engine clutch when the hybrid vehicle includes an engine clutch. However, during a substantially low temperature condition or substantially low charging state (State Of Charge: SOC), since the output of the battery is limited, the control technology which does not release the engine clutch has recently applied to a hybrid vehicle control technology.

Additionally, by the operation of a driver, even in the situation such as a sports mode or a forced charging mode, the vehicle body is driven without releasing the engine clutch. When the engine clutch is not released as the above described, since the engine rotation speed is synchronized with the motor rotation speed as shown in FIG. 1, and since the engine penetration sound by the high rotation speed is generated, the driver may feel heterogeneity. Accordingly, tuning a shift pattern to the motor rotation speed during the maximum regenerative breaking may be limited.

SUMMARY

The present invention provides a shift control method and apparatus of a hybrid vehicle controlled by dualizing a brake shift pattern according to whether an engine clutch release is possible when a hybrid vehicle brake is engaged.

A shift control apparatus of a hybrid vehicle according to an exemplary embodiment of the present invention may include: a hybrid controller configured to detect whether engine clutch release is possible, based on battery state information and input data depending on an operation of a driver; and a shift controller configured to execute a gear shift by a brake shift pattern based on whether the engine clutch release is possible.

Additionally, the hybrid controller may be configured to determine a state which the engine clutch release is not possible when the battery is a in a reduced temperature state or a charging state is less than a threshold level. The hybrid controller may further be configured to determine a state which the engine clutch release is not possible when a transmission mode selection switch or a forced charging mode selection switch is turned on by the driver. Further, the shift controller may be configured to execute the gear shift by a motor brake shift pattern when the engine clutch release is possible. The shift controller may also be configured to execute the gear shift by an engine brake shift pattern when the engine clutch release is not possible.

A shift control method of a hybrid vehicle according to an exemplary embodiment of the present invention may include: detecting whether engine clutch release is possible when a brake is detected; and executing a gear shift by a brake shift pattern based on whether the engine clutch release is possible.

The detection of whether engine clutch release is possible may include determining that the engine clutch release is not possible when the battery is in a reduced temperature state or a charging state is less than a threshold level. In addition, the detection of whether engine clutch release is possible may include determining that the engine clutch release is not possible when a transmission mode selection switch or a forced charging mode selection switch is turned on by the driver. The execution of a gear shift may include executing the gear shift by a motor brake shift pattern when the engine clutch release is possible. In addition, the execution of a gear shift may include executing the gear shift by an engine brake shift pattern when the engine clutch release is not possible.

The present invention may be controlled by dualizing a brake shift pattern according to whether an engine clutch release is possible when a hybrid vehicle brake is engaged. Accordingly, the present invention may be controlled to prevent engine rotation speed from being reached to the area which generates the engine penetration sound greater than a threshold even though the combination of the engine clutch is maintained, and thus may reduce the generation of the engine penetration sound which causes the driver to feel the heterogeneity.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

It is understood that the term “vehicle” or “vehicular” or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, with reference to the accompany drawings, embodiments of the present invention will be explained in detail.

Figure 1:
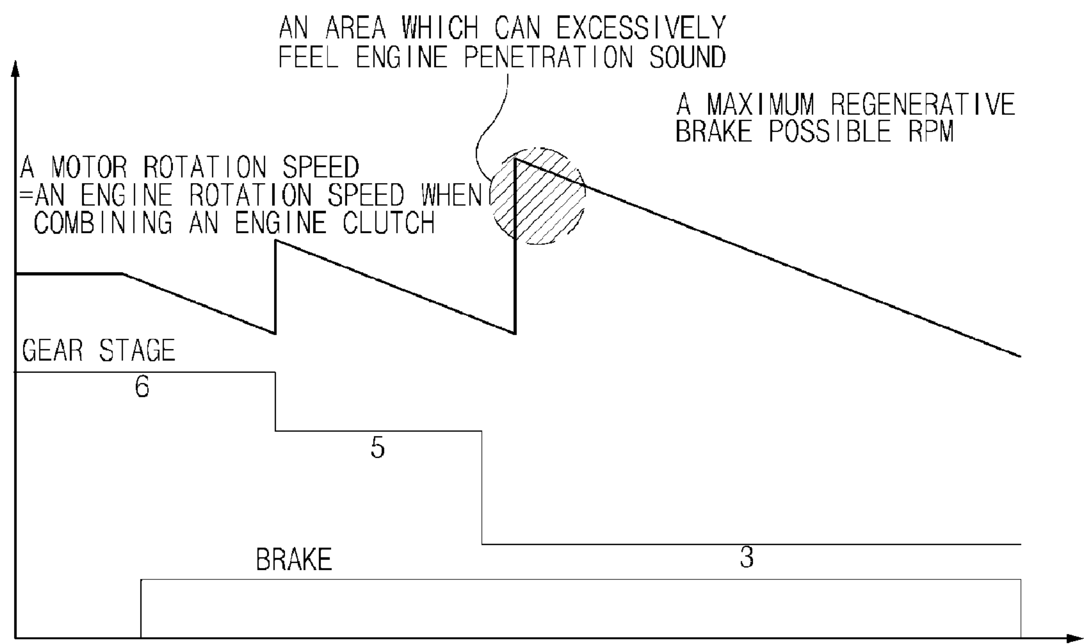
FIG. 1 is an exemplary diagram showing a motor and an engine brake shift pattern when coupling an engine clutch according to the related art.
Figure 2:
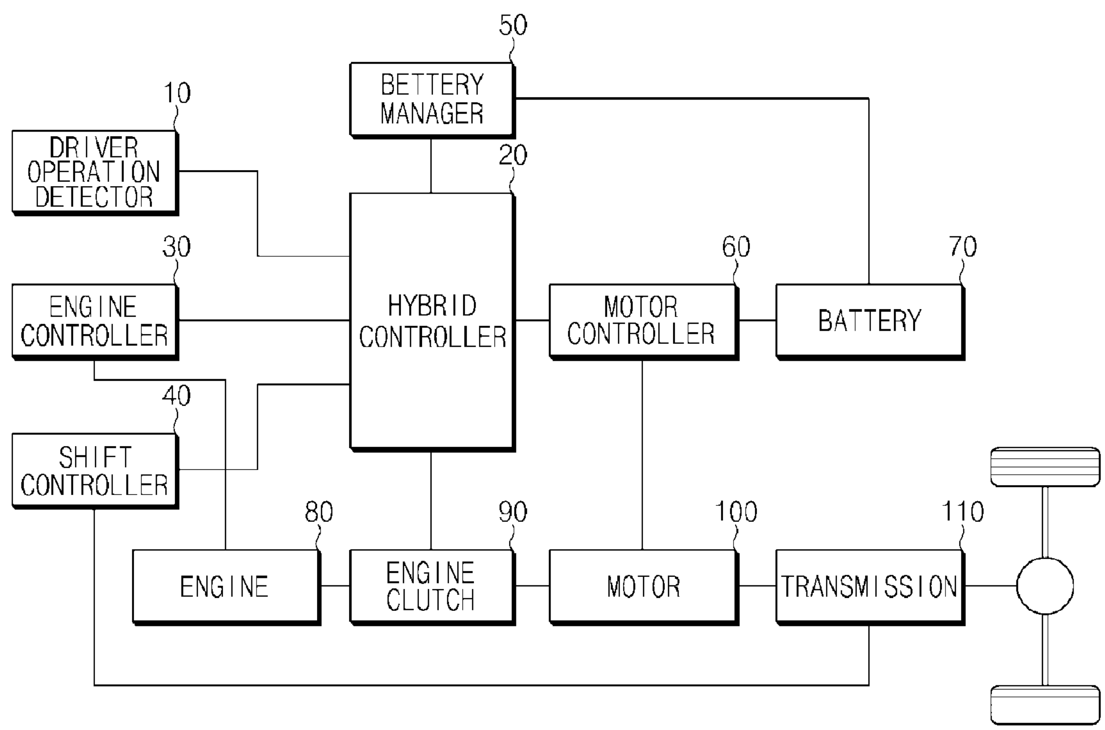
FIG. 2 is an exemplary block diagram showing a brake control apparatus of a hybrid vehicle according to an exemplary embodiment of the present invention.

FIG. 2 is an exemplary block diagram showing a brake control apparatus of a hybrid vehicle according to an exemplary embodiment of the present invention. Referring to FIG. 2, a brake control apparatus of a hybrid vehicle may include a driver operation detector 10, a hybrid controller 20 (Hybrid Control Unit: HCU), an engine controller 30 (Engine Control Unit: ECU), a shift controller 40 (Transmission Control Unit: TCU), a battery manager 50 (Battery Management System: BMS), a motor controller 60 (Motor Control Unit: MCU), a battery 70, an engine 80, an engine clutch 90, a motor 100 and a transmission 110.

The driver operation detector 10 may be configured to detect the input data by the operation of the driver. The input data may include a position of a selector lever, a transmission mode (e.g., an economy mode, a sports mode, a winter mode, a manual mode (Tiptronic, Steptronic)), selection switch input, a forced charging mode selection switch input and the like.

The hybrid controller 20 may be configured to operate the overall driving of the vehicle, and integrally operate each of controllers connected via a network. In particular, the network may be CAN (Controller Area Network), FlexRay, MOST (Media Oriented Systems Transport), LIN (Local Interconnect Network) and the like. The hybrid controller 20 may be configured to detect whether the engine clutch release is possible, based on the input data transmitted from the driver operation detector 10 and the battery state information provided from the battery manager 50. When the release of the engine clutch 90 is possible, the hybrid controller 20 may be configured to release the combination of the engine clutch 90 and when the release of the engine clutch 90 is not possible, the combination of the engine clutch 90 may be maintained. In other words, the hybrid controller 20 may be configured to determine the state which the engine clutch cannot be released when the transmission mode selection switch (e.g., sports mode selection switch) is in an on state or the forced charging mode selection switch is in an on state by the driver.

Furthermore, the hybrid controller 20 may be configured to determine the state which the engine clutch release is not possible when the battery 70 is in a reduced temperature state (e.g., temperature less than a predetermined temperature) or the charging state is less than a threshold level (e.g., 20%). The hybrid controller 20 may then be configured to transmit the result detection of whether the engine clutch release is possible to the shift controller 40. The engine controller 30 may be configured to supply or block the fuel to the engine 80 based on the control signal transmitted from the hybrid controller 20. The engine controller 30 may then be configured to adjust the fuel ratio supplied to the engine 80 based on the control of the hybrid controller 20.

The shift controller 40 may be configured to receive the shift stage signal based on the operation of the shift lever by a driver control of the transmission 110. Additionally, the shift controller 40 may be configured to automatically execute the gear shift based on the preset shift pattern according to the engine performance and the driving situation (e.g., the driving speed of the vehicle). When a brake is detected during the driving of the vehicle, the shift controller 40 may be configured to detect whether the engine clutch release is possible through the hybrid controller 20. In other words, when the input of the brake pedal switch (BPS) is detected, the shift controller 40 may be configured to detect whether the engine clutch is combined.

Further, the shift controller 40 may be configured to operate the transmission 110 and shift the gear by the different brake shift pattern according to whether the engine clutch release is possible. In other words, the brake shift pattern may be different depending on whether the engine clutch release is possible. Particularly, the brake shift pattern may be a motor brake shift pattern or an engine brake shift pattern. The motor brake shift pattern and engine brake shift pattern may be preset in advance. When the engine clutch 90 is the state which may be released as determined by the shift controller 40 the engine clutch 90 may be operated to perform the maximum regenerative breaking using the motor brake shift pattern. In particular, since the acceleration is possible in a lower stage on reaccelerating departure after braking, the operability may be improved as well as the fuel efficiency.

The battery manager 50 may be configured to detect the overall parameters of the battery 60 such as the voltage, the current, the temperature, etc., manage and adjust the charging state (State Of Charge: SOC) and the charging/discharging current amount, and transmit the information to the hybrid controller 20. The motor controller 60 may be configured to adjust the output torque of the motor 100 based on the control signal provided from the hybrid controller 20.

When the gear shift is proceeding (e.g., when the gear is being shifted), the motor controller 60 may be configured to adjust the torque input to the transmission 110 as 0 when the engine clutch 90 is combined, and when the gear shift is ended (e.g., the gear shift is complete), the motor controller 60 may be configured to adjust the output torque of the motor 100 to be input to the transmission 110.

The battery 70 may be a high voltage battery and may be configured to supply a power source to the motor 100. In addition, the battery 70 may be charged by the regenerative energy of the motor 100 operated by a generator in the regenerative braking mode. The output torque of the engine 80 may be adjusted based on the control of the engine controller 30. The engine clutch 90 may be disposed between the engine 80 and the motor 100 and may intermit the output torque of the engine 80. The motor 100 may be operated according to the operation of motor controller 60 and the output torque may be adjusted minimally. The transmission 110 enables the hybrid vehicle to be driven by adjusting the shift ratio by the gear shift according to the control of the shift controller 40.

Figure 3:
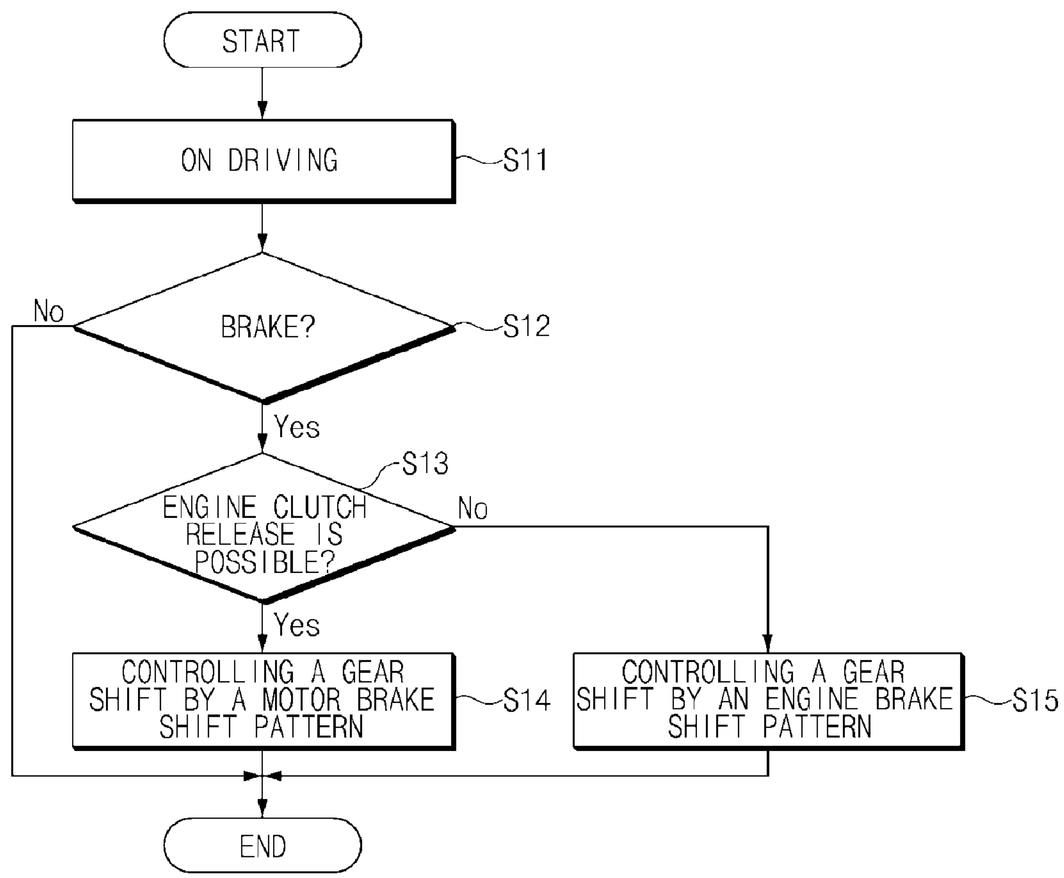
FIG. 3 is an exemplary flow chart showing a brake control method of a hybrid vehicle according to an exemplary embodiment of the present invention.
Figure 4:
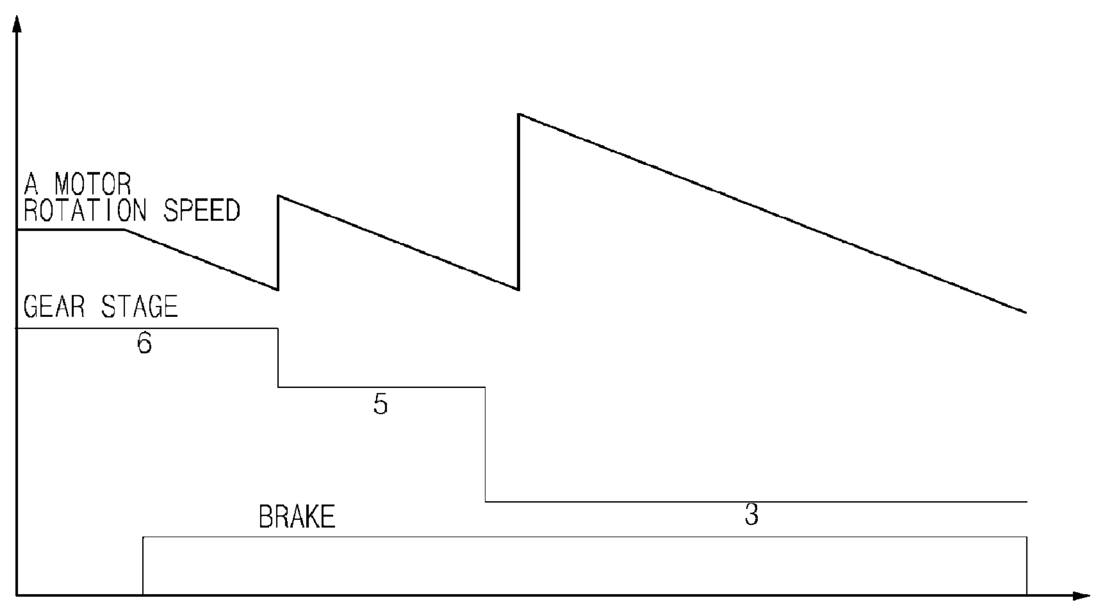
FIG. 4 is an exemplary diagram showing a motor brake shift pattern according to an exemplary embodiment of the present invention.
Figure 5:
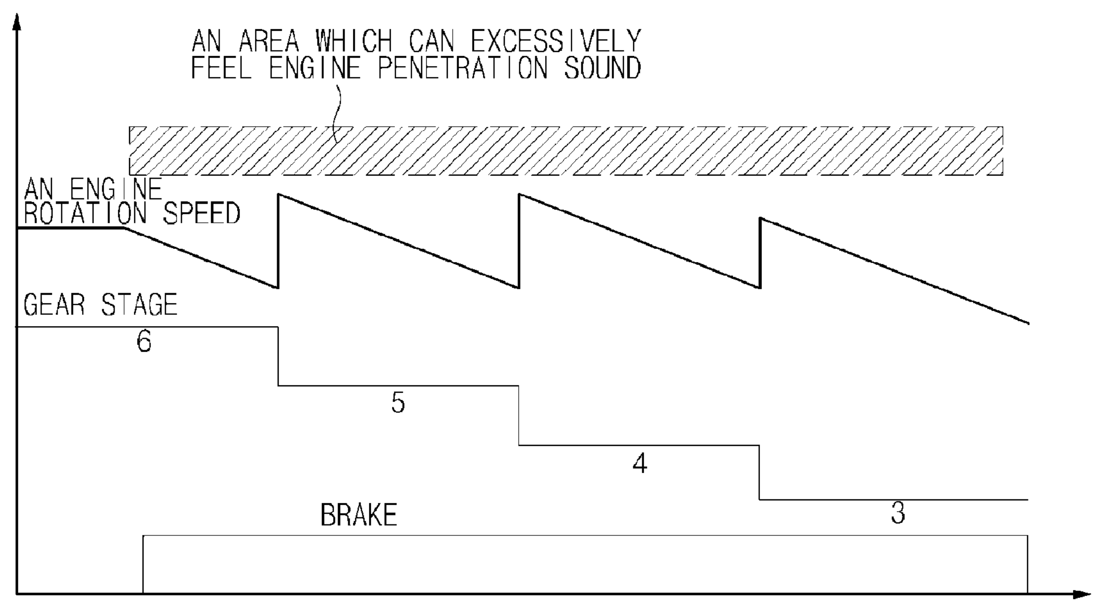
FIG. 5 is an exemplary diagram showing an engine brake shift pattern according to an exemplary embodiment of the present invention.

FIG. 3 is an exemplary flow chart showing a brake control method of a hybrid vehicle according to an exemplary embodiment of the present invention, FIG. 4 is an exemplary diagram showing a motor brake shift pattern according to an exemplary embodiment of the present invention, and FIG. 5 is an exemplary diagram showing an engine brake shift pattern according to an exemplary embodiment of the present invention.

Referring to FIG. 3, the shift controller 40 may be configured to detect a brake while the hybrid vehicle is running (S11, S12). In other words, the shift controller 40 may be configured to detect the input of the brake pedal switch (BPS) during driving of the vehicle. When the brake is detected (e.g., brake engagement is detected), the shift controller 40 may be configured to determine whether the release of the engine clutch 90 is possible (S13). The shift controller 40 may further be configured to detect whether the engine clutch is combined using the detection result of whether the engine clutch release is possible transmitted from the hybrid controller 20. When transmission mode selection switch or the forced charging mode selection is in an on state, the hybrid controller 20 may be configured to determine the state which the engine clutch release is not possible, and when the battery 70 is in a reduced temperature state or the charging state is less than a threshold level, the hybrid controller 20 may be configured to determine the state which the engine clutch release is not possible.

When the release of the engine clutch 90 is possible, the shift controller 40 may be configured to shift the gear by operating the transmission 110 by the motor brake shift pattern (S14). The hybrid controller 20 may thus be configured to release the engine clutch 90. For example, the shift controller 40 may be configured to operate the transmission 110 by the motor brake shift pattern as shown in FIG. 4. The motor controller 60 may also be configured to charge the battery 70 by the regenerative energy generated by the deceleration or braking engagement. Further, when the release of the engine clutch 90 is not possible, the shift controller 40 may be configured to execute the gear shift of the transmission 110 by the engine brake shift pattern (S15). For example, when the engine clutch 90 is in the combining state, the shift controller 40 may be configured to shift the gear by operating the transmission 110 by the engine brake shift pattern.

As the above described, according to the present invention, since the shift controller 40 may be configured to shift the gear shift by the engine brake shift pattern when the engine clutch release is not possible, the engine clutch may be operated to be prevented from reaching the area (A) which generates the engine penetration sound greater than a threshold level (see FIG. 5).

What is claimed is:

1. A shift control apparatus of a hybrid vehicle, comprising:
- a hybrid controller configured to determine whether engine clutch is released or not, based on battery state information and input data from a operation; and
- a shift controller configured to execute a gear shift by a brake shift pattern different according to determining whether the engine clutch is released or not, when a brake is detected during a driving of the hybrid vehicle,
- wherein the shift controller is configured to execute the gear shift by an engine brake shift pattern when release of the engine clutch is not determined.

2. A shift control apparatus of a hybrid vehicle according to claim 1, wherein the hybrid controller is configured to determine a state which the engine clutch is not released when the battery is in a reduced temperature state or a charging state is less than a threshold level.

3. A shift control apparatus of a hybrid vehicle according to claim 1, wherein the hybrid controller is configured to determine a state which the engine clutch is not released when a transmission mode selection switch or a forced charging mode selection switch is turned on.

4. A shift control apparatus of a hybrid vehicle according to claim 1, wherein the shift controller is configured to execute the gear shift by a motor brake shift pattern when release of the engine clutch is determined.

5. A shift control method of a hybrid vehicle, comprising:
- determining, by a controller, whether engine clutch is released or not when a brake is detected during driving of the vehicle;
- executing, by the controller, a gear shift by a brake shift pattern different according to determining whether the engine clutch is released or not, when the brake is detected during a driving of the hybrid vehicle; and
- executing, by the controller, the gear shift by an engine brake shift pattern when release of the engine clutch is not determined.

6. A shift control method of a hybrid vehicle according to claim 5, further comprising:
- determining, by the controller, that the engine clutch is not released when the battery is in a reduced temperature state or a charging state is less than a threshold level.

7. A shift control method of a hybrid vehicle according to claim 5, further comprising:
- determining, by the controller, that the engine clutch is not released when a transmission mode selection switch or a forced charging mode selection switch is turned on.

8. A shift control method of a hybrid vehicle according to claim 5, further comprising:
- executing, by the controller, the gear shift by a motor brake shift pattern when release of the engine clutch is determined.

9. A non-transitory computer readable medium containing program instructions executed by a controller, the computer readable medium comprising:
- program instructions that determine whether engine clutch is released or not when a brake is detected during driving of the vehicle;
- program instructions that detect a gear shift by a brake shift pattern different according to determining whether the engine clutch is released or not, when a brake is detected during a driving of a hybrid vehicle; and program instructions that execute the gear shift by an engine brake shift pattern when release of the engine clutch is not determined.

10. The non-transitory computer readable medium of claim 9, further comprising:

program instructions that determine that the engine clutch is not released when the battery is in a reduced temperature state or a charging state is less than a threshold level.

11. The non-transitory computer readable medium of claim 9, further comprising:

program instructions that determine that the engine clutch is not released when a transmission mode selection switch or a forced charging mode selection switch is turned on.

12. The non-transitory computer readable medium of claim 9, further comprising:

program instructions that execute the gear shift by a motor brake shift pattern when release of the engine clutch is determined.

* * * * *